No. 679,927. Patented Aug. 6, 1901.
W. A. WARMAN.
METHOD OF MAKING SCREWS.
(Application filed Apr. 4, 1900.)
(No Model.)
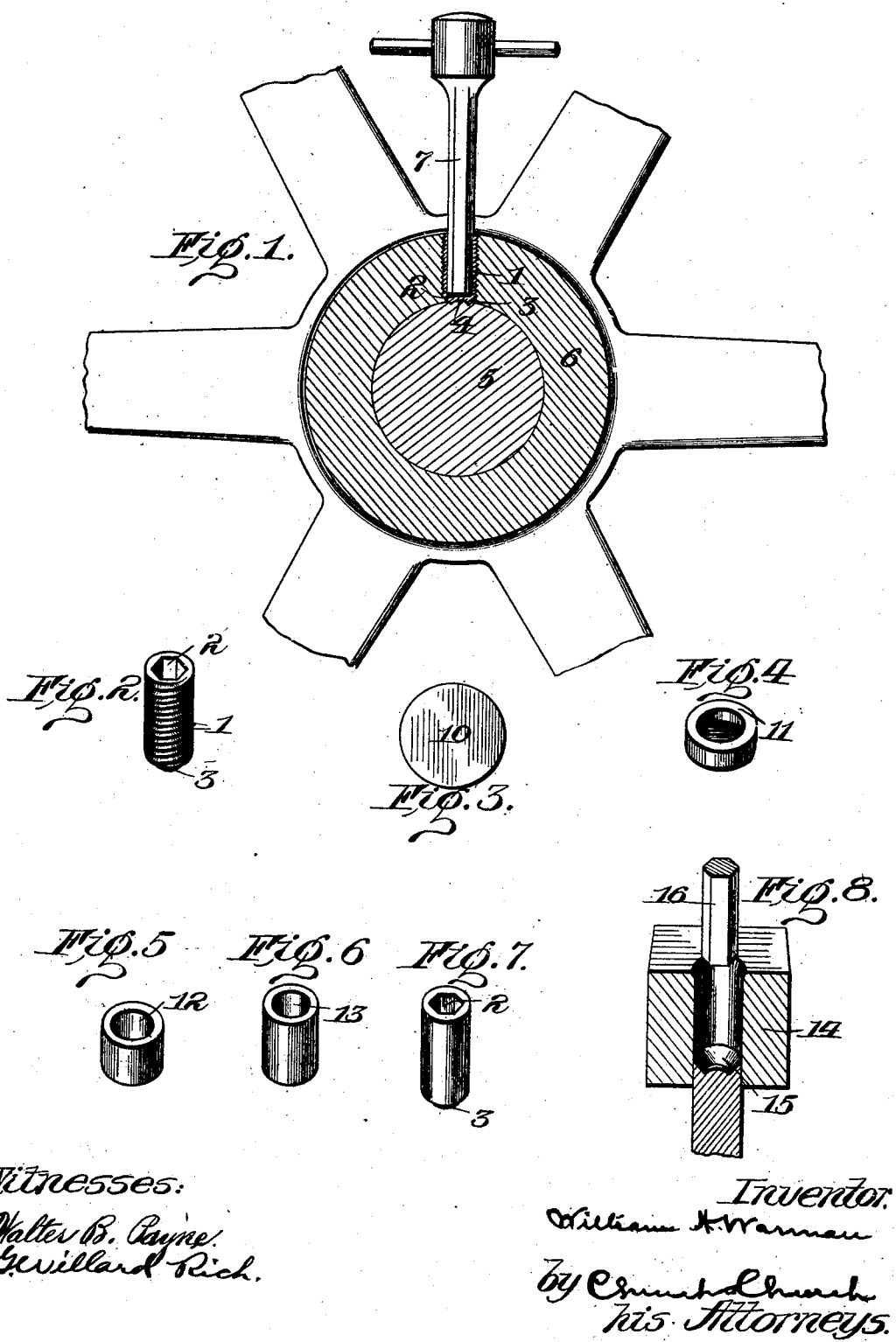
Witnesses:
Walter B. Payne
G. Willard Rich
Inventor
William A. Warman
by Church & Church
his Attorneys.

UNITED STATES PATENT OFFICE.

WILLIAM A. WARMAN, OF ROCHESTER, NEW YORK, ASSIGNOR OF ONE-HALF TO MAX H. FISCHER, OF NEW YORK, N. Y.

METHOD OF MAKING SCREWS.

SPECIFICATION forming part of Letters Patent No. 679,927, dated August 6, 1901.

Application filed April 4, 1900. Serial No. 11,528. (No model.)

*To all whom it may concern:*

Be it known that I, WILLIAM A. WARMAN, of Rochester, in the county of Monroe and State of New York, have invented a certain new Method of Making Screws; and I do hereby declare the following to be a full, clear, and exact description of the same, reference being had to the accompanying drawings, forming a part of this specification, and to the reference-numerals marked thereon.

Heretofore set-screws adapted for securing wheels or other operating or operated parts to shafts or analogous purposes have been constructed of solid pieces of metal having threaded exteriors and with the ordinary slotted or recessed upper ends for the application of a screw-driver or wrench, but such devices have been not only expensive to manufacture, but are open to the further objection that they are liable to break off in the recess adapted for them and that the slot or recess at the upper end becomes worn or misshapen, thereby necessitating the use of a drill to form a new aperture or recess and a threading-tap or a punch to enable the operator to secure a firm grip on the piece to remove it. My present invention is designed to remedy these defects by providing a method whereby a set or similar screw may be formed in which the operating wrench or mandrel may obtain a firm grip on the screw for substantially its whole length, and thereby prevent breaking it and enabling the operator to secure sufficient power to move it, even when somewhat rusted in place. Furthermore, the screws manufactured according to my method may be constructed cheaply and economically of sheet metal, preferably steel, thus utilizing scrap material and producing a serviceable device at a nominal cost.

In the drawings, Figure 1 is a sectional view of a wheel and shaft secured by a set-screw constructed in accordance with my invention; Fig. 2, a perspective view of a complete screw; Fig. 3, a view of a blank from which the screws are made; Figs. 4, 5, and 6, views showing the blank in different stages of manufacture; Fig. 7, a perspective view of the blank before threading; and Fig. 8, a sectional perspective view of a punch and die for shaping the blank, as in Fig. 7.

Similar reference-numerals indicate similar parts in the figures.

The screw made by my method is shown complete in Figs. 1 and 2 and embodies a structure composed of a single piece of metal having the exterior thread 1 and an internal aperture or recess 2 of irregular outline, preferably polygonal, extending nearly the entire length of the screw, so that the walls are of substantially the same thickness from end to end, though the central aperture or recess may be tapered slightly, if desired. The lower end of the screw is also of substantially the same thickness as the walls and may be slightly beveled at the edges 3 exteriorly and slightly concaved at the bottom 4, if desired, or otherwise shaped to engage the surface of the shaft or other part with which it is adapted to coöperate.

The manner of using the screw when employed as a set-screw is clearly shown in Fig. 1, in which 5 indicates a shaft, and 6 a portion of a wheel-hub, in which the screw is secured by means of a wrench 7, having a handle and a polygonal or irregular shaped shank or mandrel adapted to and fitting the interior recess of the screw and capable of insertion to the bottom thereof, thereby affording a long and firm bearing therein and enabling a firm grip to be had in the screw to remove or insert it and this without the possibility of slipping or breaking or wearing the edges or parts in such manner as to require drilling or tapping to cause its removal.

These screws may be and are made cheaply from sheet metal, preferably steel, the flat blank or metal disk (indicated by 10 in Fig. 3) being drawn or formed up with ordinary cylindrical punches and dies successively into the forms shown in Figs. 4, 5, and 6 and indicated by 11, 12, and 13, and the final operation of completing the screw-blank in the form shown in Fig. 7 being accomplished by the combination punch and die shown in Fig. 8, in which latter the die 14 is provided with a cylindrical aperture and a shaped bottom 15, calculated to give the appropriate form to the end of the screw-blank, while the punch 16 is of irregular outline, preferably polygonal, and of such size relative to the aperture in the die as to form the inside recess of the blank correctly without unduly weakening the sides, the operation of this punch and die elongating the shell or capsule, reducing its diameter and causing the metal to flow around the polygonal punch and decreasing the thickness of the shell only at the angles of the punch an amount equal to the variation of the polygon from a cylinder or circle. After being formed the blank is provided with the exterior thread by the use of any suitable threading-machine, the irregularly-shaped outline of the recesses permitting the introduction of a suitable mandrel for holding the blank during the operation.

Screws according to my invention may be made rapidly of scrap-steel at a nominal cost, and they are found in practice to be much superior to the ordinary solid screws for the reasons above noted.

I prefer in practice that the central longitudinal recess in the screw be hexagonal in cross-section, though a pentagonal or septagonal might be used; but a material variation from these toward a greater number of angles or edges might not afford sufficient holding-ground for the turning-wrench or a mandrel and a smaller number would not approach near enough to a cylinder (this being the form of the capsule or cup-shaped blank 13) to cause the sheet metal to draw and flow correctly in the final punching operation to produce walls of substantially equal thickness, such as would be afforded by sheet metal, and afford a holding-ground for the wrench or mandrel on all sides and substantially the full length of the screw.

Instead of cutting the threads upon the screw by means of a lathe or die they could, of course, be rolled or swaged in the usual manner; but I prefer to cut them for a screw of the character of the one herein described.

I claim as my invention—

1. The method of making screws consisting in drawing a flat blank of sheet metal into a cylindrical shell or capsule with a closed lower end, then simultaneously reducing the exterior diameter and giving the interior a polygonal form in cross-section and finally threading the exterior of the screw, substantially as described.

2. The method of making screws, consisting in drawing a flat blank of sheet metal into a cylindrical shell or capsule with a closed lower end, then simultaneously reducing the exterior diameter, shaping the lower end and giving the interior a polygonal form in cross-section and finally threading the exterior of the screw substantially as described.

WILLIAM A. WARMAN.

Witnesses:
FREDK. F. CHURCH,
G. WILLARD RICH.